US006760479B1

(12) United States Patent
Feria

(10) Patent No.: US 6,760,479 B1
(45) Date of Patent: Jul. 6, 2004

(54) SUPER PREDICTIVE-TRANSFORM CODING

(75) Inventor: Erlan H. Feria, Princeton, NJ (US)

(73) Assignee: Research Foundation of the City University of New York, New York, NY (US)

( * ) Notice: Subject to any disclaimer, the term of this patent is extended or adjusted under 35 U.S.C. 154(b) by 610 days.

(21) Appl. No.: 09/696,197

(22) Filed: Oct. 23, 2000

Related U.S. Application Data

(60) Provisional application No. 60/160,910, filed on Oct. 22, 1999.

(51) Int. Cl.[7] .................................................. G06K 9/36
(52) U.S. Cl. ........................ 382/238; 382/248; 382/251
(58) Field of Search ................................ 382/232, 248, 382/250, 251, 246, 247, 244, 236, 238

(56) References Cited

U.S. PATENT DOCUMENTS

| | | | | |
|---|---|---|---|---|
| 5,295,203 A | * 3/1994 | Krause et al. | .............. | 382/248 |
| 5,933,571 A | * 8/1999 | Bannai et al. | .............. | 386/109 |
| 5,966,470 A | * 10/1999 | Miyashita et al. | .......... | 382/248 |
| 6,396,955 B1 | * 5/2002 | Abe | ........................... | 382/232 |

OTHER PUBLICATIONS

"Predictive–Transform Residual Vector Quantization," Syed A. Rizvi et al., 1998 Internatiopnal Conference on Image Processing vol. 2, Oct. 4–7, 1998, pp. 584–588.*

"Fixed and Adaptive Predictors for Hybrid Predictive/Transform Coding," Staffan Ericsson, IEEE Transactions on Communications, vol. COM–33, No. 12, Dec. 1985, pp. 1291–1302.*

Feria and Rizvi, Super Predictive Transform Residual Vector Quantization (with Syed A. Rizvi), *Proceedings of 1999 IEEE International Conference on Image Processing,* Kobe, Japan, Oct. 24–28, 1999.

Said and Pearlman, A new fast and efficient image codec based on set partitioning in hierarchical trees, *IEEE Trans. CSVT*, vol. 6, n. 3, pp 243–250, Jun. 1996.

"Super Predictive–Transform Coding", *Proceedings of 1999 DSP World ICSPAT*, Orlando, Florida, Nov. 2–4, 1999.

Feria, E.H., "Predictive–Transform Coding," *Proceedings of 1986 IEEE NAECON*, Dayton, Ohio, May 1986.

Erlan H. Feria, "Linear predictive transform of monochrome images," *Image and Vision Computing,* vol. 5, No. 4, Nov. 1987, pp. 267–278.

Erlan H. Feria, "Analog and Leaky Predictive Transform Image Coding for Noisy Channels: Further Results," *IEEE NAECON*, May 1992.

* cited by examiner

*Primary Examiner*—Wenpeng Chen
(74) *Attorney, Agent, or Firm*—Darby & Darby

(57) ABSTRACT

A method of compressing a digital image including the steps of dividing the image into a plurality of blocks, at least some of which blocks may be partially superimposed with other blocks, generating uncorrelated coefficient or coefficient error vectors, preferably using a minimum mean squared error (MMSE) predictive-transform (PT) coding methodology, quantizing each coefficient or coefficient error vector using scalar quantizers, preferably linear scalar quantizers, storing a coefficient or coefficient error matrix consisting of the quantized coefficient error vectors, decomposing the stored quantized coefficient or coefficient error matrix into a plurality of uncorrelated groups of quantized coefficient errors and zero-run symbols, or into uncorrelated groups of quantized coefficient errors as well as a zero-run amplitude dependent group and zero-run length dependent group, and losslessly encoding each of the uncorrelated groups of symbols, for example, using a fixed or adaptive Huffman or Artihmetic coder.

18 Claims, 3 Drawing Sheets

SUPER PREDICTIVE-TRANSFORM CODING

This patent application claims the priority of U.S. provisional patent application No. 60/160,910 filed Oct. 22, 1999, which is incorporated herein by reference.

FIELD OF THE INVENTION

The present invention relates to image compression in general and, more particularly, to an improved predictive-transform method and apparatus for use in image compression.

BACKGROUND OF THE INVENTION

There are many image compression methods and devices known in the art. Some known prior art compression methods are based on coding schemes which decompose images into blocks. Such known methods may use uncorrelated coefficients or coefficient errors, for example Discrete Cosine Transform (DCT). However, these schemes are currently not considered to be the most efficient compression schemes. Further, at high compression ratios, methods using image block decomposition tend to produce artifacts, the most prominent of which are "blocking" artifacts where a pattern of the image blocks may be visible in the image reproduced after decompression. Known image compression standards using such schemes include JPEG and MPEG.

Said and Pearlman wavelet coding, also known as S&P wavelet coding, is presently considered to be the most efficient image compression technique available and is commercially used for image compression applications in both private industry and government institutions. Said and Pearlman wavelet coding is described in Said and Pearlman, "A new fast and efficient image coder based on set partitioning in hierarchical trees, " IEEE Trans. CSVT, vol. 6, n. 3, pp 243–250, June 1996. An algorithm used in this technique method is available from the Rensselaer Polytechnic Institute, Troy, N.Y.

Notwithstanding a superior efficiency over other known image compression methods, the S&P wavelet algorithm suffers excessive smoothing when operating at low bit rates. This excessive smoothing manifests itself in blurred images.

In Feria, E. H., "Predictive-Transform Coding,", Proceedings of 1986 IEEE NAECON, Dayton, Ohio, May 1986, the present inventor describes a lossy compression scheme characterized by an uncorrelated coefficient error superstructure.

SUMMARY OF THE INVENTION

A fundamental problem addressed by the present invention is the combined lossy lossless compression of digital signals and images for efficient storage of the images and/or their transmission in bandwidth limited channels. The compressed images can be monochrome or color images and can be used for the compression of still and moving pictures. There are potential applications for the method and apparatus of the present invention in diverse fields, including but not limited to efficient storage of images for personal computers, storage of medical images, storage of finger prints and ballistic or bullet prints, storage of planetary images, transmission of facsimile information for commercial applications, transmission and storage of digital images in the movie industry and other industries, and transmission of digital images for high definition television (HDTV) systems.

The present invention successfully overcomes the excessive smoothing problem associated with the S&P wavelet algorithm. This is achieved by integration of several novel ideas into a method which is hereinafter referred to as Super Predictive-Transform (PT) Coding.

The application of lossless compression in accordance with an embodiment of the present invention to using either q distinct Huffman type coders or an Arithmetic coder that must be reinitialized after each new group of quantizer symbols is received. This approach has led to a significant improvement in the compression derived from the Super Predictive-Transform Coder. The present invention can be successfully applied to other coding algorithms such as those used for JPEG and MPEG or to any other coding scheme where uncorrelated coefficients are used.

The superimposed geometry of the coder input and prediction vectors of the Super Predictive-Transform in accordance with the present invention leads to the elimination of undesirable blocking artifacts that are otherwise obtained with PT based coders when operating at very low bit rates.

An aspect of the present invention involves the "integration" of a new symbol stream generator, Huffman or Arithmetic coders with properly synchronized initializations, the superimposed geometry of the coder input and prediction signals, and simple round off scalar quantizers in a minimum mean squared error (MMSE) predictive-transform modeling and coding formulation. The synergistic operation of all of the aforementioned inventions together with a solid theoretical foundation is what has given rise to a simple, elegant, and powerful technique which has proven to outperform the S&P wavelet algorithm.

The Super PT coder of the present invention does not suffer of the smoothing problem encountered with the S&P wavelet algorithm.

The Super PT coder does not suffer of blocking artifacts when operating at very low bit rates. This is due to the superimposition property of each encoded pixel block.

The lossless encoding of each element of a truncated coefficient error in accordance with an embodiment of the present invention, significantly improves the Signal-to-Noise Ratio (SNR) and visual quality of the reconstructed images.

It will be understood by persons skilled in the art, in view of the detailed description below, that the present invention can be implemented by computer software or dedicated hardware or any combination of computer software and hardware, in accordance with specific applications.

DETAILED DESCRIPTION OF PREFERRED EMBODIMENTS

Figure 1:
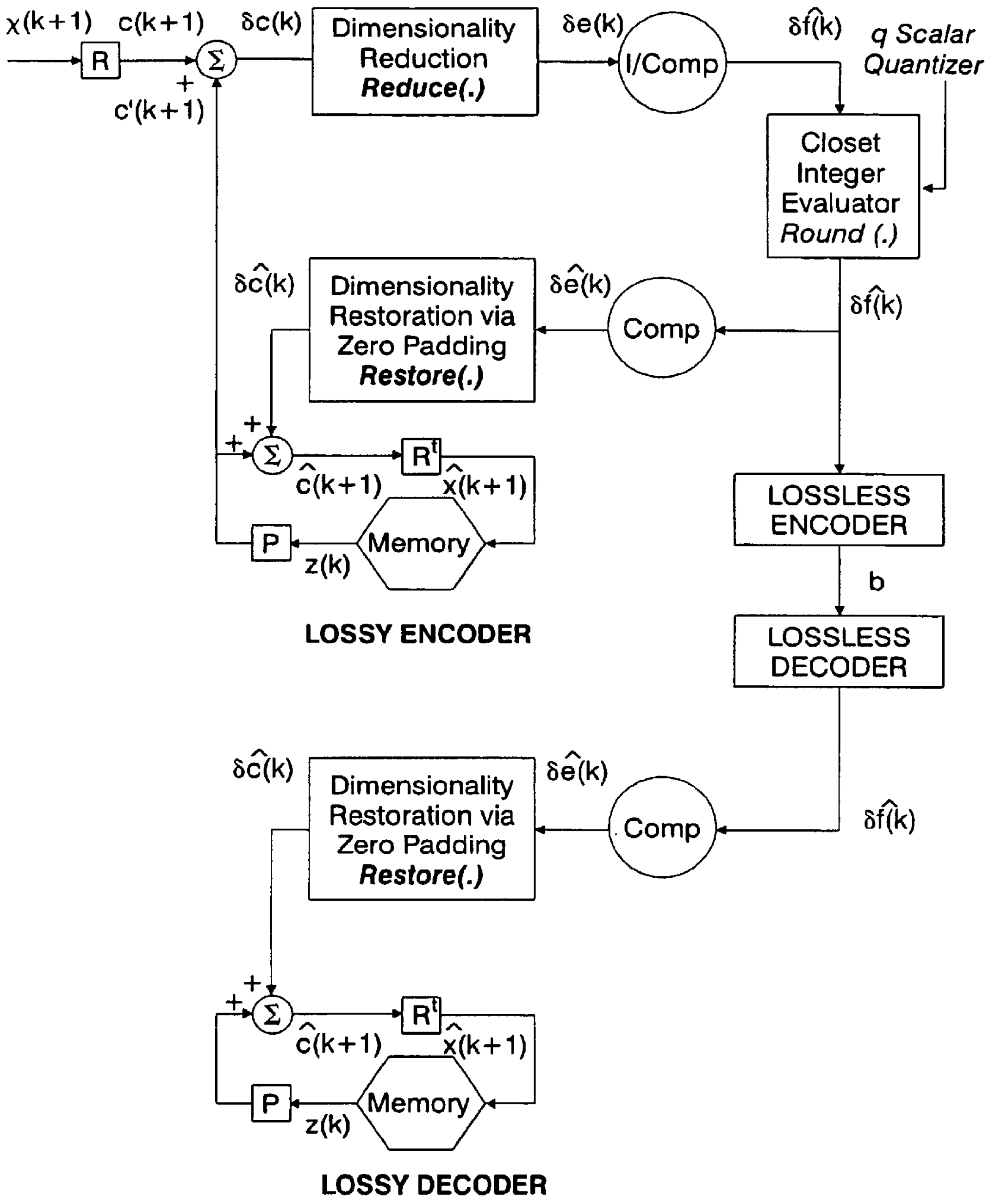
FIG. 1 is a schematic block diagram illustrating a lossy super predictive transform encoder/decoder scheme in accordance with an embodiment of the present invention.
Figure 2:
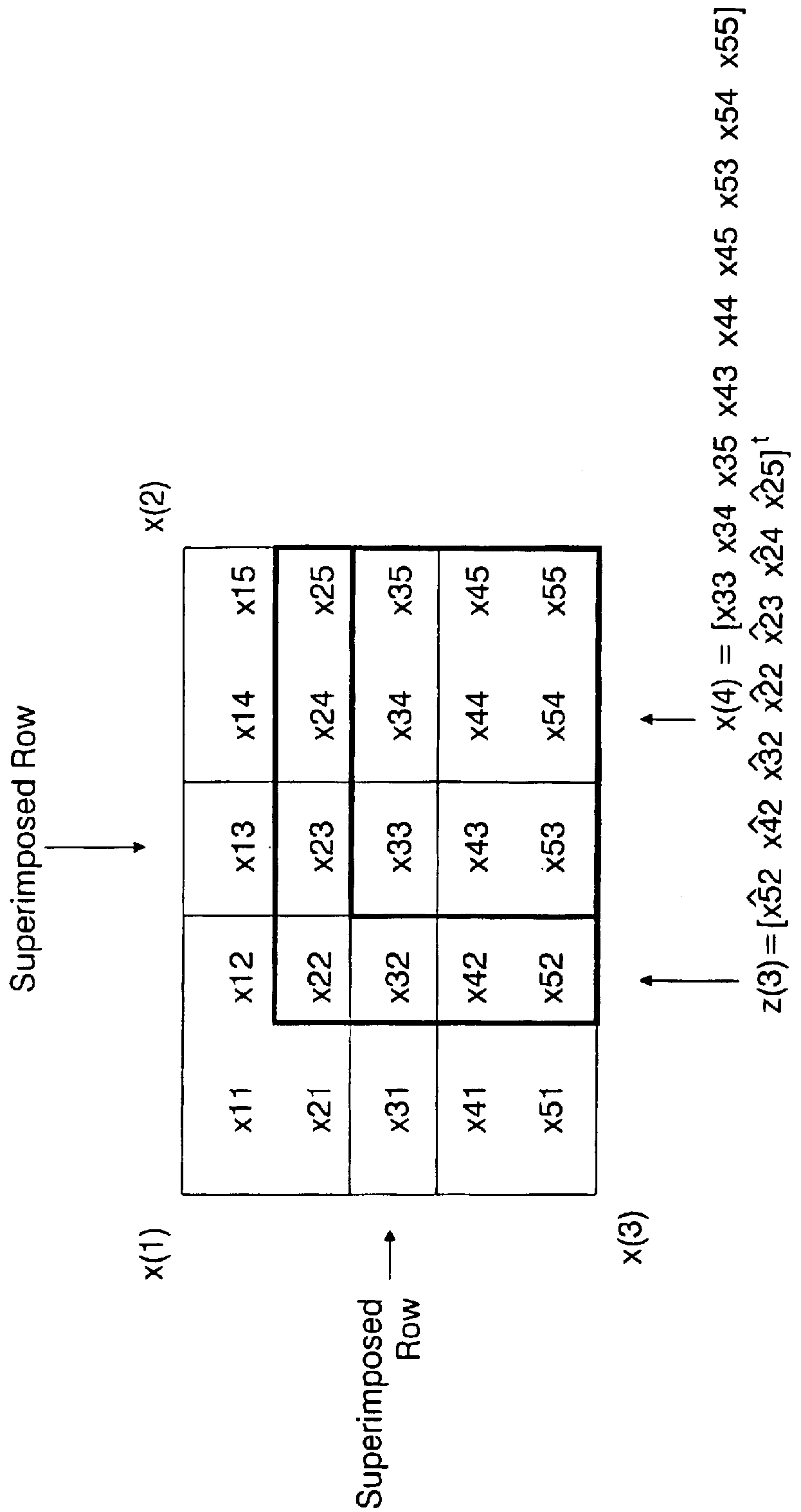
FIG. 2 is a schematic illustration of an exemplary geometry for block superposition and prediction in accordance with an embodiment of the present invention.
Figure 3:
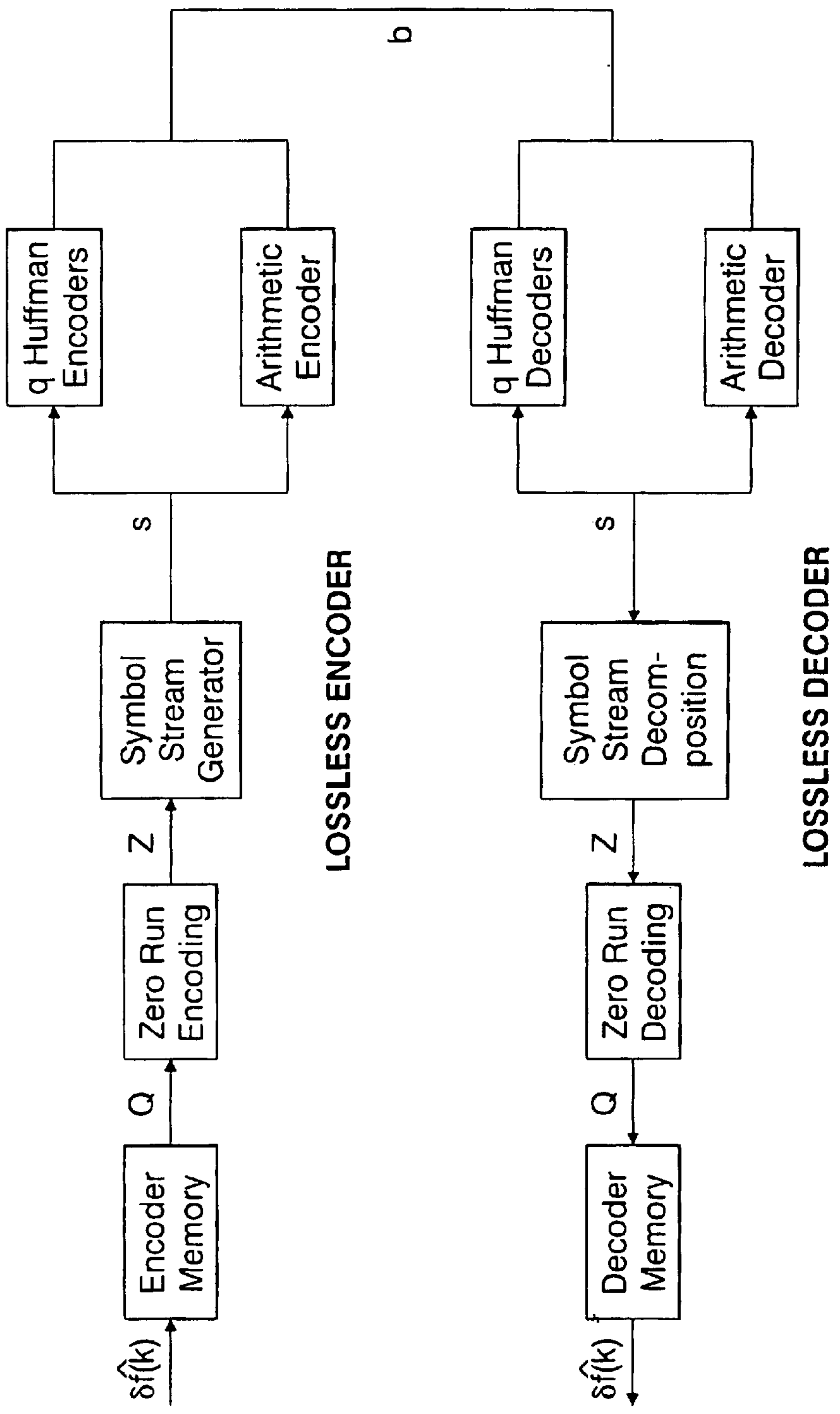
FIG. 3 is a schematic block diagram illustrating a lossless encoder/decoder scheme in accordance with an embodiment of the present invention.

Super Predictive-Transform Coding schemes in accordance with the present invention are depicted in FIGS. 1, 2, and 3 and may consists of either or both lossy and lossless encoders and decoders and may also include a particular geometry for the coder input and prediction signals, as discussed below. A lossy encoder/decoder is shown in detail in FIG. 1, a geometry for the input and prediction signals is depicted in FIG. 2, a lossless encoder/decoder is depicted in FIG. 3. The overhead information needed by the decoder is documented as well as the proper initialization of the coder are also discussed below.

The lossy encoder and decoder of FIG. 1 may be characterized by the following twelve signals:

A coder input vector x(k+1) of dimension n×1.

The coefficient vector c(k+1) of dimension n×1.

The coder input and coefficient vector estimates $\hat{x}$(k+1) and $\hat{c}$(k+1).

The prediction vector z(k) of dimension m×1.

The predicted coefficient vector c'(k+1) of dimension n×1.

The coefficient error or innovation vector δc(k) of dimension n×1. More specifically, $$\delta c(k)=[\delta c_1(k)\delta c_2(k)\ \ldots\ \delta c_n(k)]^t \tag{1}$$

with the variance of each scalar element $\delta c_j(k)$ decreasing as the value of j increases from 1 to n. Also the coefficient error δc(k) is zero mean with uncorrelated elements. A justification of these properties, for instance, the formulation of minimum mean squared error (MMSE) predictive-transform coding, may be found in Feria, E. H., "Predictive-Transform Coding,", Proceedings of 1986 IEEE NAECON, Dayton, Ohio, May 1986.

The aforementioned justification of these properties is described in this paper as follows.

The specific characteristics of our algorithm that result in a readily implementable coder with low reproduction distortion at high compression rates are several. These are: 1. the subset of previously estimated samples that are used to predict each transform coefficient is composed of only those samples which are significantly correlated to the transform coefficients. 2. In practical applications unbiased scalar quantizers can be used to encode the coefficient errors between the transform coefficient and their predicted values. This is the case since the algorithm transform and predictor matrices minimize the mean square error between a data block and its estimate subject to the constraint that the coefficient errors are uncorrelated and also have zero mean value. Although scalar quantizers are only strictly optimum in the case where the coefficient errors are also independent, e.g. for uncorrelated gaussian data, it is often found that scalar quantizers are quite adequate in applications dealing with uncorrelated but dependent data samples (see (5) and section IV). 3. In practical applications such as the video example of section IV it is found that the multiplications required by the transform and predictor matrices can be easily implemented with additions, subtractions, and register shifts. This is due to the robustness of the predictor and transforms matrices which yield excellent performance even when their optimum elements are roughly approximated by readily implementable values such as 0, ½, ¼, ¾, etc. 4. Relatively small data blocks can yield low reproduction distortion.

The aforementioned formulation of minimum mean squared error (MMSE) predicative-transform coding is described in this paper as follows.

The transform and predictor matrices T and P that minimize the MSE (20) subject to constraints (13)–(19) are obtained from the evaluation of the following matrix equations:

$$\{E[x(k+1)x^t(k+1)]-A\}T_i=\lambda_i T_i\quad i=1,\ \ldots\ ,W \tag{21}$$

$$A=\begin{bmatrix} E[x(k+1)z^t(k)] & \begin{matrix}1/2\\ \vdots\\ 1/2\end{matrix} \end{bmatrix}\begin{bmatrix} E[z(k)z^t(k)] & \begin{matrix}1/2\\ \vdots\\ 1/2\end{matrix} \\ 1/2\ \ldots\ 1/2 & 0 \end{bmatrix}^{-1}=\begin{bmatrix} E[z(k)x^t(k+1)] \\ 1/2\ \ldots\ 1/2 \end{bmatrix} \tag{22}$$

and $$\begin{bmatrix} P_i \\ \mu_i \end{bmatrix}=\begin{bmatrix} E[z(k)z^t(k)] & \begin{matrix}1/2\\ \vdots\\ 1/2\end{matrix} \\ 1/2\ \ldots\ 1/2 & 0 \end{bmatrix}^{-1}\begin{bmatrix} E[z(k)x^t(k+1)] \\ 1/2\ \ldots\ 1/2 \end{bmatrix}T_i \tag{23}$$

$$i=1,\ \ldots\ ,W$$

where: a) $\{T_i\}$ and $\{P_i\}$ are the columns of the transforms and predictor matrices T and P; b) $E[x(k+1)x^t(k+1)]$ is the second moment statistic matrix of the k-th data block x(k+1); c) $E[z(k)z^t(k)]$ is the second moment statistic of the data elements z(k) surrounding the block x(k+1); d) $E[z(k)x^t(k+1)]$ is the correlation matrix between the block x(k+1) and its surrounding data elements z(k); e) $\lambda_i$, is a Lagrange multiplier associated with the constraint $T^t_iT_j=1$ for all i; f) $\mu_i$ is a Lagrange multiplier associated with the zero mean constraint (16); and g) the matrix inversion shown in eqs. (22) and (23) is assumed to exist.

In addition, the minimum MSE obtained with these matrices is given by $$\min E[x(k+1)-\hat{x}(k+1))^t(x(k+1)-\hat{x}(k+1))]\ T,P \tag{24}$$

$$=\sum_{i=J+1}^{W}E[\Delta c_i^2(k)]$$

$$=\sum_{i=J+1}^{W}T_i^t\{E[x(k+1)x^t(k+1)]-A\}T_i$$

$$=\sum_{i=J+1}^{W}\lambda_i$$

where $\lambda_{J+1}\ldots\lambda_W$ are the smallest W–J eigenvalues of the eigensystem (21).

Also, the optimum transform and predictor matrices result in uncorrelated coefficient errors.

Constraints (13)–(19) are described in this paper as follows.

There are four constraints. These are:

Constraint 1: The basis vectors $\{T_i\}$ of the transform T will be constrained to be orthonomal $$T_i^tT_j=\begin{cases}1 & i=j\\ 0 & i\neq j\end{cases} \tag{13}$$

One reason for this constraint is to give equal weight to the energy associated with each coefficient error. Note that this constraint also implies that T is an unitary matrix, i.e., $$T^{-1}=T^t. \tag{14}$$

A second reason for this constraint is that it results in uncorrelated coefficient errors as shown in appendix A. This in turn implies that in applications (see Section IV) we can use simple scalar quantizers to encode each coefficient error, i.e.

$$Q(\Delta c(k))=[Q_i(\Delta c_i(k)), \ldots, Q_W(\Delta c_W(k))]^t$$

Where $Q_i(\Delta c_i(k)$ represents the scalar quantization of the coefficient error $\Delta c_i(k)$. Note that the scalar quantizers are not generally optimum since the coefficient errors often remain statistically dependent even if they are uncorrelated.

Constraint 2: The optimum transform and predictor matrices must yield coefficient error components with zero mean value, i.e., $$E[\Delta c_i(k)]=0 \text{ for all } i. \quad (15)$$

The objective of this constraint is to simplify the design of the scalar quantizer since it then follows that we do not need to be concerned about coefficient error elements with a nonzero mean component. It should be noted that the constraints (15) and (14) further imply the following constraint on the transform and predictor matrices:

$$U^t_W T_i - U^t_M P_i = 0 \text{ for all } i \quad (16)$$

where $U_W$ and $U_M$ are unit column vectors with W and M elements, respectively. This constraint can be readily derived as follows:

First, using FIG. 2 and Eq. (14) we note that $$\Delta c_i(k)=T^t_i x(k+1)=P^t_i z(k) \text{ for all } i. \quad (17)$$

Second and last, taking the expected value of Eq. (17), using constraint (15), and assuming that the expected value of each data sample is constant we obtain the desired result (16).

Constraint 3: The quantizer will be assumed to work as follows: a) J arbitrary coefficient error components are unaffected by the quantizer, i.e., $$\Delta \hat{c}_i(k)=\Delta c_i(k) \quad (18)$$

For J arbitrary components of $\Delta c(k)$ where J<W: and b) the remaining W−J coefficient error components are set to zero by the quantizer, i.e., $$\Delta \hat{c}_i(k)=0 \quad (19)$$

for the remaining W−J components of $\Delta\hat{c}(k)$. The basic advantage of this constraint is that it makes the evaluation of the transform and predictor matrices a mathematically tractable problem.

The truncated coefficient error vector $\delta e(k)$ of dimension q×1 where $q \leqq n$. The q elements of $\delta e(k)$ are the q most energetic elements of $\delta c(k)$, i.e., $$\delta e(k)=[\delta c_1(k)\delta c_2(k) \ldots \delta c_q(k)]^t \quad (2)$$

The scaled and truncated coefficient error vector $\delta f(k)$ of dimension q×1.

The scaled and truncated coefficient error integer vector $\delta\hat{f}(k)$ of dimension q×1.

The truncated coefficient error vector estimate $\delta\hat{e}(k)$ of dimension q×1.

The coefficient error vector estimate $\delta\hat{c}(k)$ of dimension n×1.

The bit stream b of dimension 1×B where B denotes the number of bits present in b.

The following nine subsystems may also characterize the lossy encoder and decoder:

A unitary transformation matrix R of dimension n×n that is multiplied by the coder input vector x(k+1) to yield the coefficient vector c(k+1).

A transposed transformation matrix R'—which is the same as the inverse of R due to its unitary property—of dimension n×n that is multiplied by the coefficient vector estimate $\hat{c}(k+1)$ to yield the coder input vector estimate $\hat{x}(k+1)$.

A prediction matrix P of dimension m×n that is multiplied by the prediction vector z(k) to yield the predicted coefficient vector c'(k+1).

A dimensionality reduction subsystem that multiplies the n−q less energetic elements of the n-dimensional coefficient error vector $\delta c(k)$ by zero gains. This multiplication, in turn, results in the q-dimensional truncated coefficient error vector $\delta e(k)$.

A memory device that temporarily stores recently reconstructed coder input vector estimates $\{\hat{x}(0), \ldots, \hat{x}(k)\}$. These stored vectors are used at each processing stage to construct the prediction vector z(k).

A scaling device with gain 1/Comp responsible for establishing the amount of compression associated with the coder. More specifically, the constant Comp is adjusted to produce the desired amount of compression for the coder.

q scalar quantizers implemented by finding the closest integer vector, $\delta\hat{f}(k)$, to the scaled and truncated coefficient error $\delta f(k)$, i.e., $$\delta\hat{f}(k)=\text{Round}(\delta f(k)). \quad (3)$$

A scaling device with gain Comp responsible for generating the truncated coefficient error vector estimate $\delta\hat{e}(k)$ from the scaled and truncated coefficient error integer vector $\delta\hat{f}(k)$.

A dimensionality restoration subsystem that restores the coefficient error estimate $\delta\hat{c}(k)$ from the truncated coefficient error estimate $\delta\hat{e}(k)$ via zero padding.

FIG. 2 schematically illustrates the geometry of the coder input and prediction signals in a simplified 2D image processing example, wherein xij, for all (i,j) pairs, denotes the i-th row and j-th column pixel of the image. In general the image is of dimension V×H. In the example of FIG. 2, V=5 and H=5.

The encoding is achieved by moving on the image from left to right and top to bottom, encoding a 3×3 pixel block at each processing stage (in general the pixel block size is of dimension N×N), e.g., in FIG. 2 the 3×3 pixel block:

x33 x34 x35 x43 x44 x45 (4)

x53 x54 x55 is being currently encoded. A fundamental property of this arrangement is that the top row and left column pixels of equation 4 are superimposed on previously encoded pixel blocks, e.g., note that the pixels x53, x43, x33, x34, and x35 of equation 4 were previously encoded when the 3×3 pixel blocks:

x11 x12 x13 x13 x14 x15 x31 x32 x33 x21 x22 x23 x23 x24 x25 x41 x42 x43 (5)

x31 x32 x33 x33 x34 x35 x51 x52 x53 were processed—also note that the standard PT coder first proposed by the present inventor in the 1986 IEEE NAECON conference paper "Predictive Transform Coding", does not use superimposed pixel blocks. The present invention is referred to herein as Super Predictive-Transform Coding partly because of the pixel block superimposition described above,.wherein the term "super" indicates superimposition. The term "super" in the title of the invention may also indicate superstructure, referring to the uncorrelated coefficient errors superstructure imposed by the predictive-transform methodology and leading to the highly efficient compressor presented of the invention. It has been found by the present inventor that this type of block superimposition effectively eliminates the blocking artifacts produced by PT based compression algorithms when operating at very low bit rates. Another property of the Super PT coder is that only four reconstructed pixels of the currently encoded 3×3 pixel block are permanently stored-the exception is at the end of each column and/or row when all 3×3 pixel blocks are kept. These four reconstructed pixels correspond to the top and left 2×2 pixel sub-block of the reconstructed 3×3 pixel block, e.g., for the 3×3 pixel block of equation 4, the reconstructed 2×2 pixel sub-block that may be permanently stored is given by:

$$\begin{matrix} \hat{x}\mathbf{33} & \hat{x}\mathbf{34} \\ \hat{x}\mathbf{43} & \hat{x}\mathbf{44} \end{matrix} \quad (6)$$

where the "^" notation denotes the generally inexact reconstruction of pixel xij—it is assumed here that the last image row and column has not been reached; otherwise, a larger subset of the 3×3 reconstructed pixel block is stored as needed.

The geometry of the n dimensional vector x(k+1) is defined in FIG. 2 for the special case k+1=4 where x(4) is given by the nine dimensional column vector:

$$x(\mathbf{4})=[x\mathbf{33}\ x\mathbf{34}\ x\mathbf{35}\ x\mathbf{43}\ x\mathbf{44}\ x\mathbf{45}\ x\mathbf{53}\ x\mathbf{54}\ x\mathbf{55}]^t \quad (7)$$

with its nine pixel elements obtained from the currently encoded 3×3 pixel block in equation 4. The vectors x(1), x(2), and x(3) of FIG. 2 are also appropriately defined using the three 3×3 pixel blocks given in equation 5. In turn, the geometry of the m dimensional prediction vector z(k) is defined for the special case k=3, where z(3) is given by the seven dimensional column vector:

$$z(\mathbf{3})=[\hat{x}\mathbf{52}\ \hat{x}\mathbf{42}\ \hat{x}\mathbf{32}\ \hat{x}\mathbf{22}\ \hat{x}\mathbf{23}\ \hat{x}\mathbf{24}\ \hat{x}\mathbf{25}]^t \quad (8)$$

The elements of z(3) are pixel reconstructions which reflect partial knowledge of the pixels of the presently processed 3×3 pixel block of equation 4. For instance, the pixel reconstruction x̂22 appearing in z(3) reflects knowledge about the currently encoded pixel x33 since x̂22 was originally obtained when the leftmost 3×3 pixel block shown in equation 5 is encoded. It is important to note that the Super PT formulation generally allows for an arbitrary number of top rows and leftmost columns, of the currently encoded pixel block, to be superimposed with a subset of pixels from previously encoded pixel blocks. In addition, other alternative definitions for the z(k) prediction vector are possible. Also, the suggested 2D geometry can be readily generalized to the 3D or motion picture case.

The transformation and prediction matrices, R and P, are designed off-line by solving the following coupled eigensystem and normal equations:

$$\{Ex^tx - Ex^tz \cdot Inv(Ez^tz) \cdot Ez^tx\}R = R \cdot L, \quad (9)$$

$$P = Inv(Ez^tz) \cdot Ez^tx * R \quad (10)$$

wherein $Ex^tx$, $Ez^tz$, and $Ez^tx$ are second order expectations of the coder input and predictor vectors x(k+1) and z(k), "Inv( )" denotes a matrix inversion, and L is a diagonal eigenvalue matrix. The second order expectations $Ex^tx$, $Ez^tz$, and $Ez^tx$ required to solve the coupled design equations 9 and 10 are found using natural images. A description of how the above equations are derived may be found in Feria, E. H., *"Predictive-Transform Coding,", Proceedings of* 1986 *IEEE NAECON,* Dayton, Ohio, May 1986. It should also be noted that the design equations 9 and 10 are a special case of those given in this 1986 IEEE NAECON paper, because equations 9 and 10 do not include a zero mean constraint for δc(k). Nevertheless, it has been found via extensive simulations that the design equations 9 and 10 yield coefficient errors {δc(k)}, characterized by a negligibly small mean value.

To make the presentation of the signals easier and also the operation of each subsystem of the lossless coder of FIG. 3, it will be assumed that the encoded image is the 5×5 pixel image of FIG. 2. In addition, the geometry of the coder input and prediction signals is the same as that of FIG. 2. Finally, it is assumed that the number of scalar quantizers is five, i.e., $$q=5, \quad (11)$$

the compression factor is one half, i.e., $$Comp=½, \quad (12)$$

and the four truncated coefficient error vectors corresponding to the example of FIG. 2 are given by:

$$\delta e(\mathbf{1})=[1.7\ -1.1\ 0.4\ -0.14\ 0.6]^t \quad (13)$$

$$\delta e(\mathbf{2})=[2.6\ -0.6\ 0.2\ 0.6\ 0.05]^t \quad (14)$$

$$\delta e(\mathbf{3})=[-0.2\ 0.2\ 0.01\ -0.02\ -0.1]^t \quad (15)$$

$$\delta e(\mathbf{4})=[0.4\ -0.15\ 0.1.\ 0.15\ -0.1]^t \quad (16)$$

The signals and subsystems of the lossless coder of FIG. 3 are as follows.

The uncompressed integer symbol matrix Q of dimension q×W where q is the number of scalar quantizers of FIG. 1 and W is the number of encoded pixel blocks, e.g., W=4 for the 5×5 2D image of FIG. 2. The matrix Q is derived from the encoder memory and consists of the sequence of scaled truncated coefficient error integer vectors {δf̂(1),δf̂(2), . . . ,δf̂(W)}, i.e., $$Q=[\delta\hat{f}(\mathbf{1}),\delta\hat{f}(\mathbf{2}), \ldots ,\delta\hat{f}(W)] \quad (17)$$

For instance, for the illustrative example of FIG. 2 with the assumptions (11 )-(16), the integer symbol matrix Q is found to be given by the 5×4 matrix:

$$Q = \begin{bmatrix} 3 & 5 & 0 & 1 \\ -2 & -1 & 0 & 0 \\ 1 & 0 & 0 & 0 \\ 0 & 1 & 0 & 0 \\ 1 & 0 & 0 & 0 \end{bmatrix} \quad (18)$$

A more general vector compression factor, denoted Comp__vector, of dimension q×1, may be used in conjunction with the embodiment of FIG. 1 instead of the scalar compression factor Comp described above. The q elements of the Comp__vector, i.e., $$\text{Comp\_\_vector}=[g1\ g2\ \ldots\ gq] \quad (18a)$$

may be selected such that they reflect the decreasing standard deviation associated with each element of the truncated coefficient error vector δe(k). For example, the elements }gk} of Comp__vector may be found using the following formula:

$$gk=K\exp(-a|k-q|^{b}) \text{ for } k=1, \ldots q \quad (18b)$$

wherein K is the previously defined scalar compression factor, Comp, i.e., K=Comp.

For example, using in this formula a case in which K=½, a=0.03, b=1, and q=5, yields the following compression vector.

$$\text{Comp\_\_vector}=[0.46\ 0.47\ 0.48\ 0.5] \quad (18c)$$

Dividing the {δe(k)} values in equations 13–16 above by the compression vector of equation 18c yields the following values for the scaled and truncated coefficient error vector {δf(k)}:

$$\delta f(1)=[3.86\ -2.34\ 0.85\ -0.29\ 1.2]^{T} \quad (18d)$$

$$\delta f(2)=[5.9\ -1.3\ 0.43\ 1.25\ 0.1]^{T} \quad (18e)$$

$$\delta f(3)=[-0.45\ 0.43\ 0.02\ -0.04\ -0.5]^{T} \quad (18f)$$

$$\delta f(4)=[0.91\ -0.33\ 0.21\ 0.31\ -0.5]^{T} \quad (18g)$$

Finally, an alternative Q matrix, $Q_a$, may be generated from equations 18d –18g, using equations 3 and 17, as follows:

$$Q_a = \begin{bmatrix} 4 & 6 & 0 & 1 \\ -2 & -1 & 0 & 0 \\ 1 & 0 & 0 & 0 \\ 0 & 1 & 0 & 0 \\ 1 & 0 & 0 & 0 \end{bmatrix} \quad (18h)$$

It has been confirmed by computer simulation that using a vector compression factor such as that of equation 18b improves the quality of the reconstructed pictures and the signal to noise ratio (SNR) for any given compression ratio.

A zero run integer symbol matrix z of dimension q×W is derived by determining for each column of Q (or $Q_a$) when a zero run is encountered as we move on the column from top to bottom. When a zero run is found it is represented with a special symbol r__j, wherein j corresponds to the last nonzero integer found just before the zero run is encountered. After the zero run symbol r__j a blank symbol is introduced for each deleted zero, these blank symbols do not contribute to the bit rate of the system since they are never transmitted to the decoder. For example, using the Q matrix of equation 18, the following zero run integer symbol matrix is generated:

$$Z = \begin{bmatrix} 3 & 5 & r\_0 & r\_1 \\ -2 & -1 & \text{blank} & \text{blank} \\ 1 & 0 & \text{blank} & \text{blank} \\ 0 & r\_1 & \text{blank} & \text{blank} \\ 1 & \text{blank} & \text{blank} & \text{blank} \end{bmatrix} \quad (19)$$

A symbol stream vector, s, is of dimension 1×K, wherein K is the number of non-blank symbols in Z, e.g., K=11, and wherein Z is given by equation 19, may be generated using the symbol stream generator by scanning the Z matrix from left to right and top to bottom. For the specific example of equation 19, the following symbol stream vector, s, is obtained:

$$s=[3\ 5\ r\_0\ r\_1\ -2\ -1\ 1\ 0\ 0\ r\_1\ 1] \quad (20)$$

Note that the symbol stream vector has a very special structure. That is, it collects first the symbols associated with the first scalar quantizer operating on the most energetic coefficient error, i.e., the set of symbols (3, 5, r__0, r__1) obtained from the first row of Z in equation 19, then the set of symbols (−2, −1) associated with the second quantizer, and so on until all the quantizers are accounted for.

One of two possible types of lossless compressors are used to encode the symbol stream, s, of equation 20 to yield a bit stream, b, of dimension 1×J, where J denotes to total number of bits required to encode symbol stream s plus any additional overhead data needed. The first type of compressor are q independent Huffman encoders, each encoding the appropriate set of symbols of symbol stream, s. For example, five Huffman encoders are used for the symbol stream in equation 20, the first for encoding the group of symbols (3, 5, r__0, r__1), the second for encoding the group (−2, −1), the third for encoding the group (1, 0), the fourth for encoding the group (0, r__1), and the last for encoding the symbol 1. In accordance with a more flexible scheme of the invention, the symbol stream of equation 20 may be coded with less than 5 Huffman encoders, for example, 3 Huffman encoders, the first for encoding the group of symbols (3, 5, r__0, r__1), the second for encoding the group (−2, −1), and the third for encoding the remaining symbols (1, 0, 0, r__1, 1). A hybrid technique of this type may be desirable in cases where the number of symbols for the lowest energy coefficient errors is so small that any overhead associated with either Huffman or Arithmetic coders could compromise the compression reduction that may be achieved by encoding each coefficient error separately.

The q Huffman encoders may be designed for each encoded image and their symbol-bit maps transmitted to the decoder as overhead. On the other hand, the arithmetic encoder may use either an adaptive or fixed model for the symbols distributions that is initialized q different times at the beginning of each different group of quantizer symbols. For example, for the symbol stream in equation 20, the arithmetic coder is initialized when the group of symbols (3, 5, r__0, r__1) is first encountered, then again when the group (−2, −1) is encountered, and so on until the last group of symbols arrives.

Finally, the subsystems of the lossless decoder of FIG. 3 perform the inverse operation of the lossless encoders, as will be apparent to a person of ordinary skill in the art, in view of FIG. 3.

An alternative lossless compression algorithm for encoding the integer symbol matrix Q will now be described. The basic idea of this alternative procedure is to decompose the Q matrix into three independent symbol streams, as follows:

1. An amplitude symbol stream vector, V__amp, consisting of the amplitude associated with each zero-run. For example, $$V\_amp=[1\ 1\ 0\ 1] \quad (21)$$

for the specific Q matrix given by equation 18. It should be noted that although there is no zero-run in the first column of Q and thus, the last coefficient value of 1 for the first column is used nonetheless. V__amp may be encoded using a single fixed or adaptive Huffman or Arithmetic coder, as are known in the art.

2. A length symbol stream vector, V__length, consisting of the length associated with each zero-run. For example, $$V\_length=[0\ 1\ 4] \quad (22)$$

for the Q matrix of equation 18. Note that since there is no zero-run for the first column of this Q matrix and, the first element of the vector in equation 22 is assigned a value of zero. In addition, since it is implied by the third element of the vector of equation 21 that all the elements of the third column of Q are zero, it is unnecessary to include in the vector of equation 22 the number of zeros associated with the third column. V__length may be encoded using a single fixed or adaptive Huffman or Arithmetic coder.

3. A coefficient symbol stream vector, V__coef, which is similar in structure to that of the symbol stream vector, s, illustrated in equation 20, except that it does not include the zero-run symbols. This vector may be as follows:

$$V\_coef=[3\ 5\ -2\ -1\ 1\ 0\ 0\ \text{blank}] \quad (23)$$

for the values of the Q matrix in equation 18. Note that the blank component of the vector of equation 23 corresponds to the fifth row of Q which is already fully defined by the vectors of equations 21 and 22. Consequently, it is not necessary to send this blank symbol to the decoder. V__coef is encoded using four fixed or adaptive Huffman or Arithmetic coders in the same manner as described above with reference to the symbol stream vector, s, in equation 20.

This decomposed structure may be convenient because it gives rise to more efficient lossless compressors using Huffman and/or Arithmetic coders.

An alternative representation of the zero-runs for lossless encoding is to combine the amplitude zero-run vector, V__amp, of equation 21 with the length zero-run vector, V__length, to produce a single zero-run symbol vector, V__zerorun. The resultant vector may then be encoded using a single Huffman or Arithmetic coder. The relationship between V__zerorun, V__amp and $V_{13}$ length may be defined as follows:

$$V\_zerorun=V\_amp*q-V\_length*sign(V\_amp) \quad (22a)$$

Substituting in equation 22a the exemplary values from equations 21 and 22 above, namely, q=5, V__amp=[1 1 0 1], and V__length=[0 1 blank 4] (the "blank" in this sequence representing the fact that this particular symbol is not sent to the decoder because it is implied by a corresponding "0" value in equation 21), yields the following:

$$V\_zerorun=[5\ 4\ 0\ 1] \quad (22b)$$

It should be appreciated that, on the decoder side of the scheme, V__amp and V__length may the readily reconstructed from V__zerorun.

In addition to the bits associated with the symbol stream s (or alternative symbol streams V__amp, V__length, and V__coef), the bit stream b also contains overhead information required to operate the coder. The information transmitted as overhead may include:

The scalar compression factor, Comp

The scalar number of scalar quantizers q.

The dimensions of the encoded image, V and H.

The maximum pixel value found in the image. This pixel value is used to eliminate overshoots that may be found in the reconstructed image.

The minimum pixel value of the image. This pixel value is used to eliminate undershoots that may be found in the reconstructed image.

symbol-bit maps when Huffman coders are used to compress the symbol stream s.

symbol sets when Arithmetic coders with adaptive symbol distribution models are used to compress the symbol stream, s.

symbol sets and distribution model parameters when fixed symbol distribution model are used for the Huffman or Arithmetic coders.

To initialize the coder it is assumed that the prediction vector z(0) is a constant vector whose value is given by the average value between the maximum and minimum pixel values found in the image. Alternatively, the mean value of x(1) may be used to initialize the coder, in which case it is subsequently decoded as overhead. When processing the top row or left column of an image only partial knowledge of the pixel estimates in z(k) is available. For this special case we select for the unknown pixel estimates in z(k) the same value as that of the known pixel estimate in z(k) physically closest to the unknown pixel estimates.

Several features characterize the super PT coder. For example, the way in which the symbol stream, s (or its alternative version, V__coef), is configured leads to the decomposition of the lossless compression to either q distinct Huffman coders or an Arithmetic coder that must be reinitialized after each new group of quantizer symbols is received. This approach has led to a significant improvement in the compression derived from the Super Predictive-Transform Coder. Other Huffman and Arithmetic coding algorithms such as those used for JPEG have been simulated and found to yield significantly inferior results.

Another characterizing feature is the superimposed geometry of the coder input and prediction vectors of the Super Predictive-Transform Coder of FIG. 2. This novel geometry leads to the elimination of undesirable blocking artifacts that are otherwise obtained with PT based coders when operating at very low bit rates.

Yet another characterizing feature is the integration of the proposed symbol stream generator, q Huffman coders or Arithmetic coder with q properly synchronized initializations, the superimposed geometry of the coder input and prediction signals, and simple round off scalar quantizers (3) in the minimum mean squared error (MMSE) predictive-transform modeling and coding formulation described by the applicant in Feria, E. H., *"Predictive-Transform Coding,", Proceedings of* 1986 *IEEE NAECON,* Dayton, Ohio, May 1986, which is incorporated herein by reference. The synergistic operation of all of the aforementioned inventions together with a solid theoretical foundation is what has given rise to a simple, elegant, and powerful technique which has proven to outperform the S&P wavelet algorithm.

It should be noted that the Super PT coder of the present invention does not suffer of the smoothing problem encountered with the S&P wavelet algorithm.

The Super PT coder does not suffer of blocking artifacts when operating at very low bit rates. This is due to the superimposition property of each encoded pixel block.

The lossless encoding of each element of the scaled and truncated coefficient error vector $\delta\hat{f}(k)$ as described above results in a significant improvements on the SNR and the visual quality of the reconstructed images.

A fundamental problem addressed by the invention is the compression of digital signals and images for their efficient storage and transmission in bandwidth limited channels. The compressed images can be monochrome or color images and can be used for the compression of still and moving pictures. Applications are found in diverse fields such as the efficient storage of images for personal computers, the storage of medical images, the storage of finger prints and ballistic or bullet prints, the storage of planetary images, the transmission of facsimile information for commercial applications, the transmission and storage of digital images in the movie industry and other applications, and the transmission of digital images for high definition television (HDTV) systems.

What is claimed is:

1. A method of compressing a digital image comprising the steps of:

dividing the digital image into a plurality of blocks;

generating a plurality of uncorrelated coefficient or coefficient error vectors, each coefficient or coefficient error vector corresponding to one of said blocks;

quantizing the coefficient or coefficient error vectors using a plurality of scalar quantizers;

storing a coefficient or coefficient error matrix consisting of the quantized coefficient or coefficient error vectors;

decomposing the coefficient or coefficient error matrix into a plurality of uncorrelated groups of symbols, the symbols in each uncorrelated group of symbols representing either quantized coefficient errors or zero-runs; and losslessly encoding each of said groups of symbols.

2. A method of compressing a digital image comprising the steps of:

dividing the digital image into a plurality of blocks;

generating a plurality of uncorrelated coefficient or coefficient error vectors, each coefficient or coefficient error vector corresponding to one of said blocks;

quantizing the coefficient or coefficient error vectors using a plurality of scalar quantizers;

storing a coefficient or coefficient error matrix consisting of the quantized coefficient or coefficient error vectors;

decomposing the coefficient or coefficient error matrix into a group of zero-run symbols and a plurality of uncorrelated groups of symbols, the symbols in each uncorrelated group of symbols representing quantized coefficient errors; and losslessly encoding each of said groups of symbols.

3. A method of compressing a digital image comprising the steps of:

dividing the digital image into a plurality of blocks;

generating a plurality of uncorrelated coefficient or coefficient error vectors, each coefficient or coefficient error vector corresponding to one of said blocks;

quantizing the coefficient or coefficient error vectors using a plurality of scalar quantizers;

storing a coefficient or coefficient error matrix consisting of the quantized coefficient or coefficient error vectors;

decomposing the coefficient or coefficient error matrix into a group of zero-run amplitude symbols, a group of zero-run symbols and a plurality of uncorrelated groups of symbols, the symbols in each uncorrelated group of symbols representing quantized coefficient errors; and losslessly encoding each of said groups of symbols.

4. A method according to claim 1 wherein each of at least some of said plurality of blocks is at least partly superimposed with at least one other block.

5. A method according to claim 2 wherein each of at least some of said plurality of blocks is at least partly superimposed with at least one other block.

6. A method according to claim 3 wherein each of at least some of said plurality of blocks is at least partly superimposed with at least one other block.

7. A method according to claim 1 wherein the step of generating a plurality of uncorrelated coefficient or coefficient error vectors comprises the step of calculating said coefficient or coefficient error vectors using minimum mean squared error (MMSE) methodology.

8. A method according to claim 2 wherein the step of generating a plurality of uncorrelated coefficient or coefficient error vectors comprises the step of calculating said coefficient or coefficient error vectors using minimum mean squared error (MMSE) methodology.

9. A method according to claim 3 wherein the step of generating a plurality of uncorrelated coefficient or coefficient error vectors comprises the step of calculating said coefficient or coefficient error vectors using minimum mean squared error (MMSE) methodology.

10. A method according to claim 1 wherein said plurality of scalar quantizers comprise a plurality of linear scalar quantizers.

11. A method according to claim 2 wherein said plurality of scalar quantizers comprise a plurality of linear scalar quantizers.

12. A method according to claim 3 wherein said plurality of scalar quantizers comprise a plurality of linear scalar quantizers.

13. A method according to claim 1 wherein the step of losslessly encoding each of said groups of symbols comprises losslessly encoding at least some of said groups of symbols using fixed or adaptive Huffman coding.

14. A method according to claim 2 wherein the step of losslessly encoding each of said groups of symbols comprises losslessly encoding at least some of said groups of symbols using fixed or adaptive Huffman coding.

15. A method according to claim 3 wherein the step of losslessly encoding each of said groups of symbols comprises losslessly encoding at least some of said groups of symbols using fixed or adaptive Huffman coding.

16. A method according to claim 1 wherein the step of losslessly encoding each of said groups of symbols comprises losslessly encoding at least some of said groups of symbols using fixed or adaptive Arithmetic coding.

17. A method according to claim 2 wherein the step of losslessly encoding each of said groups of symbols comprises losslessly encoding at least some of said groups of symbols using fixed or adaptive Arithmetic coding.

18. A method according to claim 3 wherein the step of losslessly encoding each of said groups of symbols comprises losslessly encoding at least some of said groups of symbols using fixed or adaptive Arithmetic coding.

* * * * *

UNITED STATES PATENT AND TRADEMARK OFFICE

CERTIFICATE OF CORRECTION

PATENT NO. : 6,760,479 B1 
DATED : July 6, 2004
INVENTOR(S) : Erlan H. Feria

It is certified that error appears in the above-identified patent and that said Letters Patent is hereby corrected as shown below:

Title page,
Item [*] Notice, please insert:
-- Subject to any disclaimer, the term of this patent is adjusted under 35 U.S.C. 154(b) by 610 day(s) --.

Signed and Sealed this

Eleventh Day of January, 2005

JON W. DUDAS
*Director of the United States Patent and Trademark Office*